W. T. HIBLER.
CORN PLANTER.
APPLICATION FILED JAN. 8, 1916.
1,236,562.
Patented Aug. 14, 1917.
2 SHEETS—SHEET 1.
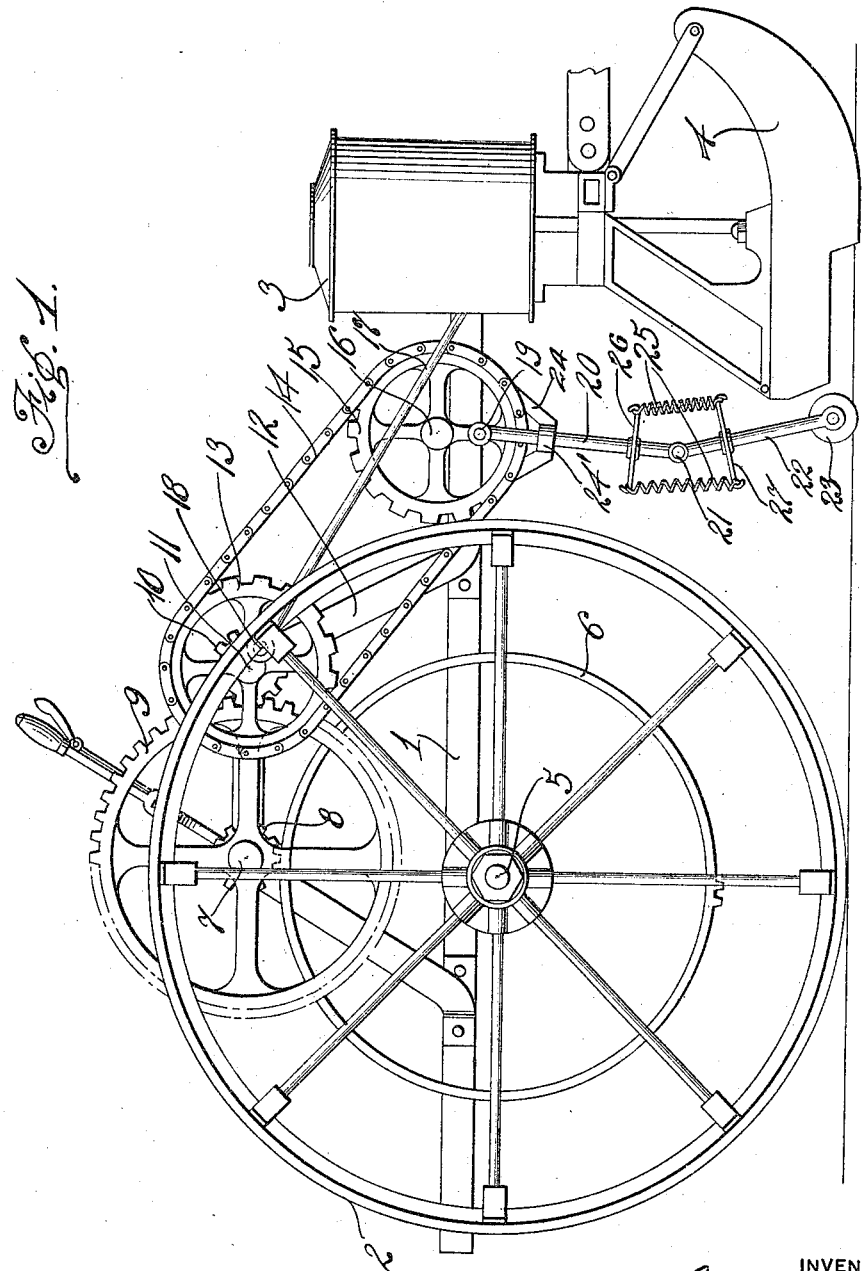

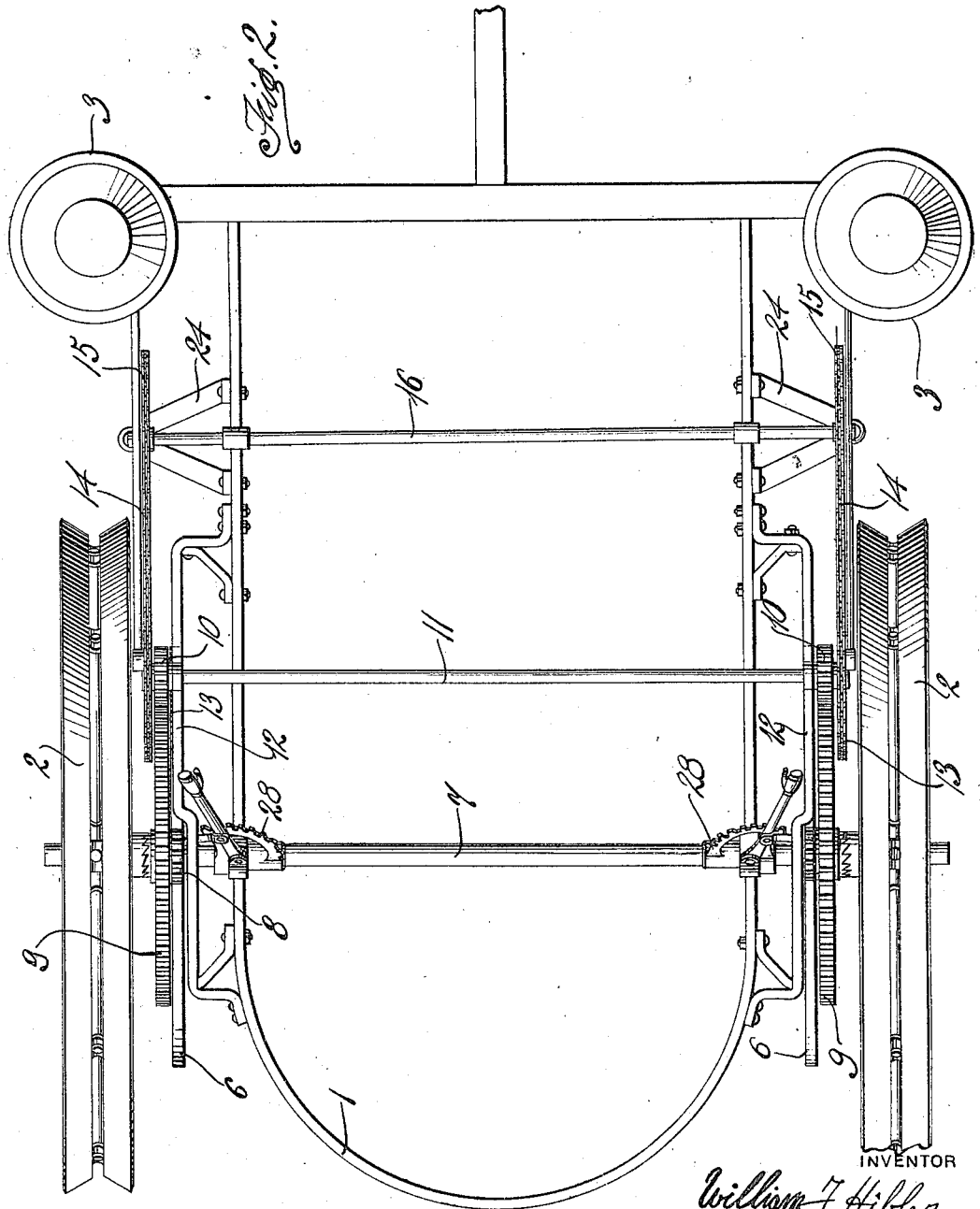

ved corn planter, and
UNITED STATES PATENT OFFICE.

WILLIAM T. HIBLER, OF OWENSVILLE, MISSOURI.

CORN-PLANTER.

1,236,562.   Specification of Letters Patent.   Patented Aug. 14, 1917.

Application filed January 8, 1916. Serial No. 71,073.

*To all whom it may concern:*

Be it known that I, WILLIAM T. HIBLER, a citizen of the United States, residing at Owensville, in the county of Gasconade and State of Missouri, have invented certain new and useful Improvements in Corn-Planters, of which the following is a specification.

My invention relates to agricultural devices or machines and more particularly to an improved corn planter of a construction designed to obviate the use of the now common check-row attachment.

In describing my invention in detail reference will be had to the accompanying drawings wherein like characters denote like or corresponding parts throughout the several views, and in which:—

Figure 1 is a side elevation of my improved corn planter, and

Fig. 2 is a top plan view.

Referring now to the drawings by numerals, 1 designates the machine frame, 2—2 the supporting wheels therefor (the wheels being of an accepted straddle-row type), 3—3 the seed boxes or receptacles, 4 a well known type of runner (there being an independently operable shoe or runner for each seed box or receptacle) and 5 an axle. Before continuing the description of the operation of the planter I desire it to be understood that independently operable seed dropping mechanism (not shown) is associated with and located interiorly of each seed receptacle 3. In view of the fact that the means employed to operate each of the said mechanisms is the same, a detailed description of but one of said means will ensue. The reference characters used in the ensuing description will for the above reasons appear in duplicate.

A gear 6 is mounted on the axle 5, the gear being of a peculiar type in that four teeth are provided, the teeth being arranged in pairs, each pair being disposed in diametrically opposed relation. A shaft 7, disposed in parallelism with the axle 5, is so situated with respect to the gear 6 as to provide for proper meshing engagement of the teeth of gear 6 with the teeth of a pinion 8 mounted on said shaft, such engagement causing said shaft 7 to be given a one-sixth revolution to every one-half revolution of the gear 6. The pinion 8 is to be equipped with twelve teeth.

A second and comparatively large gear 9 is mounted on the shaft 7, the teeth of this latter gear being in mesh with the teeth of a gear 10 mounted on a shaft 11 disposed to extend in parallelism with the shaft 7, the shaft 7 and the shaft 11 being journaled in bearings secured to an auxiliary frame 12 which is in turn secured to the main frame 1 of the machine. The gears 9 and 10 should be designed in the ratio of one to six causing gear 10, to be given one complete revolution, to every one-sixth revolution of the gear 9.

A sprocket 13 is mounted on the shaft 11 over which a chain is arranged to operate, the chain in turn engaging a sprocket 15 mounted on a shaft 16 disposed forwardly of the shaft 11, in parallelism therewith, and in bearings therefor secured to the main frame 1. Pivoted as at 18 to the sprocket 13 is a rod 19, said rod having connection at its forward end with the seed dropping mechanism (not shown) that said mechanism may be operated once to each complete revolution of the shaft 11.

Pivoted as at 19' to the sprocket 15 is a rod 20, said rod being in turn pivoted as at 21 to a rod 22 bifurcated at its free end to receive and support a land marking disk 23, operating directly behind the runner 4. A bearing 24 is swiveled to a bracket 24' which is hung from the main frame 1 to act as a guide for the rod 20 that the said rod may be vertically reciprocated and oscillated by the rotation of the sprocket 15. Equalizer springs 25 engage with brackets 26 and 27 secured respectively to the rods 20 and 22 that the latter may be yieldingly maintained in the position desired. As suggested, it will be observed that the land marking disk 23 comes in contact with the ground at a point directly adjacent the discharge terminal of the spout leading from the runner 4.

A suitable clutch mechanism designated in its entirety by the numeral 28 is operatively associated with each operating mechanism that the said mechanisms may be rendered operative or inoperative as desired.

As before intimated, the operation of the mechanism at each side of the machine is the same.

From the foregoing taken in connection with the accompanying drawings, it will be noted that each complete revolution of the supporting wheels 2 will cause the seed dropping mechanism to be actuated twice and said marker to be simultaneously moved into engagement with the ground; that said marker is disposed for operation in the immediate vicinity of the discharge spout of the seed dropping mechanism; and that the springs 25 will yieldingly hold the marker in engagement with the ground and accordingly cushion its movement under all circumstances.

Having thus fully described my invention, what I claim as new and desire to secure by Letters Patent is:—

In a corn planter, the combination of a wheel supported frame, a wheel journaled for rotation on the frame, means for rotating said wheel intermittently from the supporting wheels, a pin eccentrically mounted on the face of the wheel, a bracket supported upon the frame, a bearing swiveled on the bracket, a jointed rod having one section slidably mounted in said bearing and connected to the pin, a marker wheel on the other end of the rod, oppositely extending arms on each section adjacent the point of connection of said section, and springs connecting the arms of the sections to resiliently retain the sections in alinement.

In testimony whereof I affix my signature in presence of two witnesses.

WILLIAM T. HIBLER.

Witnesses:
W. M. PASCH,
J. W. HENSLEY.

Copies of this patent may be obtained for five cents each, by addressing the "Commissioner of Patents, Washington, D. C."